United States Patent [19]

Holzbaur

[11] 4,161,932

[45] Jul. 24, 1979

[54] FUEL INJECTION SYSTEM

[75] Inventor: Siegfried Holzbaur, Stuttgart, Fed. Rep. of Germany

[73] Assignee: Robert Bosch GmbH, Stuttgart, Fed. Rep. of Germany

[21] Appl. No.: 888,084

[22] Filed: Mar. 17, 1978

Related U.S. Application Data

[63] Continuation-in-part of Ser. No. 562,859, Mar. 27, 1975, Pat. No. 4,079,718.

[30] Foreign Application Priority Data

Mar. 29, 1974 [DE] Fed. Rep. of Germany ....... 2415182

[51] Int. Cl.[2] ...................... F02M 39/00; F16K 15/03

[52] U.S. Cl. ......................... 123/139 AW; 137/527.8; 261/44 A

[58] Field of Search ............ 123/139 AW; 137/527.8, 137/499; 251/305; 261/44 R, 44 A

[56] References Cited

U.S. PATENT DOCUMENTS

| | | | |
|---|---|---|---|
| 1,477,280 | 12/1923 | Pordes | 261/44 A |
| 1,493,894 | 5/1924 | Reece | 261/44 A |
| 1,534,212 | 4/1925 | Hess | 261/44 A |
| 1,746,681 | 2/1930 | Richardson | 261/44 A |
| 1,839,102 | 12/1931 | Kessel | 261/44 A |
| 2,617,638 | 11/1952 | Udale | 261/44 A |
| 2,755,818 | 7/1956 | Dietz | 261/44 A |
| 3,144,045 | 8/1964 | Fitzpatrick | 137/527.8 |
| 3,352,318 | 11/1967 | Yanowitz | 137/527.8 |
| 3,926,215 | 12/1975 | Macleod | 137/527.8 |

FOREIGN PATENT DOCUMENTS

| | | | |
|---|---|---|---|
| 611784 | 10/1926 | France | 261/44 A |

*Primary Examiner*—Charles J. Myhre
*Assistant Examiner*—David D. Reynolds
*Attorney, Agent, or Firm*—Edwin E. Greigg

[57] ABSTRACT

A fuel injection system for externally ignited internal combustion engines including a device for injecting fuel into an air stream and an air measuring device comprising a valve having an airfoil portion. The air measuring valve is pivotably mounted within the suction tube of the engine, thereby exposing the air measuring valve to the air stream flowing through the suction tube. The air measuring valve is exposed to a combination of forces. One of the forces is an impedance induced force developed in accordance with the principle associated with impedance type valves and as a function of the pressure prevailing in front of and behind the air measuring valve when viewed in the direction of flow of the air stream in the suction tube. The other force is a lift force and is developed in accordance with the airfoil principle and as a result of an air flow about the airfoil portion of the air measuring valve. The impedance induced force occurs when the air flow through the suction tube is small, whereas when the air flow through the suction tube is large, the predominant force is the lift force developed in accordance with the airfoil principle.

12 Claims, 6 Drawing Figures

FUEL INJECTION SYSTEM

CROSS REFERENCE TO RELATED APPLICATION

This application is a continuation-in-part application of application Ser. No. 562,859, filed Mar. 27, 1975, now U.S. Pat. No. 4,079,718.

BACKGROUND OF THE INVENTION

The present invention relates to a fuel injection system for externally ignited internal combustion engines. The system comprises an air sensing or measuring device comprising a valve which is exposed to the air stream in the suction tube of the engine. The rotation of this valve by the air against a restoring force constitutes a gauge for the amount of air flowing through the suction tube.

An air measuring device of this type is designed to measure as accurately as possible the amount of air flowing through the suction tube in order to meter a corresponding quantity of fuel to the quantity of air. To enable simple air measuring means to be used and to enable the quantity of air and fuel to be proportioned through influencing the fuel injection system while avoiding the need to make subsequent major adjustments, the relationships should be linear, for example, by maintaining two opposed non-linear but similar functions.

In the case of a known air measuring device of the above type, a baffle plate, which is vertically exposed to the air stream, is pushed according to the impedance type flow valve principle (hereinafter impedance principle) by an impedance induced force against a constant restoring force such that there is a linear relationship between the displacement path and the air flowing through the suction tube. Although the constant charging deficiency caused by the impedance is not disadvantageous in the case of small quantities of air, i.e., small air flow, at full load the charging deficiency in the engine cylinders is undesirable.

In the case of another known air measuring device operating according to the impedance principle the air measuring valve is disposed on one side and is swivelled about a pivot axis according to the quantity of air flowing through the suction tube. As a result of the changed angle of attack on the leading face of the air measuring device in the air flow direction and the associated variation in the differential pressure, the positioning force on the air measuring device decreases as the opening angle increases. This has the advantage that at full load reduced charging deficiencies occur. However, it has the disadvantage that at full load measuring becomes relatively inaccurate and the restoring force is not constant, with the resulting disadvantages of influencing the fuel injection system with non-linear proportioning of the air quantity and fuel quantity.

In the case of another known air measuring device, the valve is eccentrically mounted such that a smaller part of the valve projects into the portion of the suction tube in front of the mounting and the other part of the valve projects behind the mounting. With this air measuring device, the impedance, that is, the difference in the pressure in front of and behind the valve, is initially effective, i.e., when the valve is closed, to move the valve in its opening direction and subsequently and in accordance with the airfoil principle, the lift acting on the valve is also effective. Essentially only the differential surface between the larger and smaller surface parts of the valve acts as the resulting effective surface of the valve. The force engaging this effective surface is derived from the effective surface area times the associated air index (times ram pressure) acting on this effective surface. This force acts either as a force directed at right angles to the flow direction, or as an impedance induced force acting in the flow direction. This force forms with respect to the axis of rotation of the valve, the torque (adjusting moment) acting on the valve. With a sudden transition, in the case of this known air measuring device from the impedance principle to the combined impedance—airfoil principle, virtually undeterminable functions occur between the air quantity and the regulating distance of the valve and to ensure reliable fuel metering these must be corrected, either in the fuel metering device per se or by adjusting the restoring force acting on the valve.

OBJECT AND SUMMARY OF THE INVENTION

The principal object of the present invention is to provide a fuel injection system of the above-described type in which the air measuring device produces the least possible charging deficiencies at full load and in which the torque, possibly the resultant torque acting on the valve is either linear over the entire speed and load range of the engine or it may be easily balanced by appropriate restoring forces so that preferably a constant air velocity with a constant ram pressure always prevails in the section of the suction tube uncovered by the valve for constant air density.

This object and others are accomplished according to the present invention in that with small quantities of air, i.e., small air flow, the air measuring valve is deflected in accordance with the impedance principle, as a function of the pressure prevailing in front of and behind the air measuring valve. With larger quantities of air, i.e., large air flow, there is a gradual transition of the air measuring valve to a point where the air measuring valve operates with at least a partial surface according to the airfoil principle, whereby the corresponding surface has air circulating on both sides thereof and receives a thrust or lift as a function of the air quantity flowing past and hence a resultant moment due to the air forces is developed with respect to the pivot axis of the air measuring valve. As will be made apparent hereinafter, only a gradual transition enables a linear torque or moment to be obtained or enables the transition to be balanced with the restoring force by simple means. According to a corresponding feature of the invention, the smaller section of the valve relative to the axis (leading wing edge), which is pivotable in the part of the suction tube disposed in the flow direction in front of the axis, blocks the region it controls and then, as the quantity of air or air flow increases, it gradually uncovers this region until, at full load and maximum speed, it is completely open. Preferably, the air measuring valve of the invention consists of two parts which are displaceable relative to one another, one part of which (main valve) is mounted on the suction tube and the other part of which (auxiliary valve) is, on the one hand, mounted on the main valve and, on the other hand, is kinematically adjustable via a rod, thus influencing the force moment of the air which causes the displacement of the main valve. This enables the moment factor of the valve to be varied in a simple manner which may be used both for linearization and for correcting the fuel—air ratio (λ correction or ρ correction).

According to another feature of the present invention, a bore for supplying fuel is disposed in the pin measuring of the air measuring valve. The bore communicates with at least one channel provided in the air measuring valve. This channel terminates in at least one nozzle which is preferably disposed at the end of the air measuring valve. By virtue of this arrangement, on the one hand, the fuel is injected into the air stream in the highest speed region, thus providing for good mixing and, on the other hand, fuel metering can be effected with simple means and short lines by the air measuring device itself.

Other objects, features and advantages of the present invention will be made apparent in the following detailed description of the various embodiments thereof which is provided with reference to the accompanying drawings.

DESCRIPTION OF THE PREFERRED EMBODIMENTS

Figure 1:
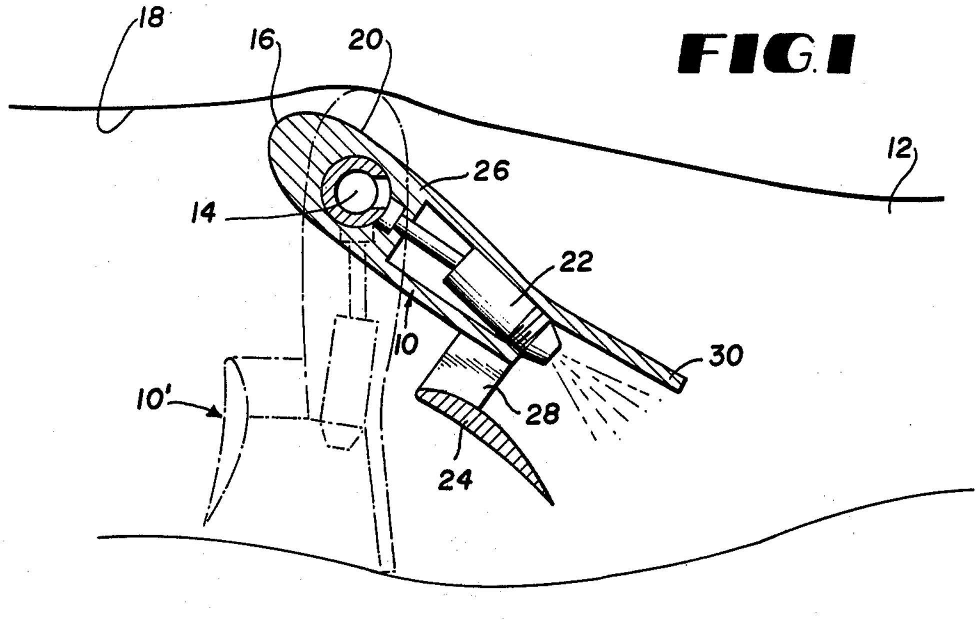
FIG. 1 illustrates a first embodiment of the invention with a main valve and auxiliary valve.

In FIG. 1 there is illustrated an air measuring valve 10 eccentrically mounted for rotation in a suction tube 12 by a pin 14.

The disposition of the air measuring valve 10 according to the present invention has considerable technical advantages in terms of flow. To illustrate this point, in FIG. 1 two positions of the air measuring valve 10 are represented. The corresponding reference numbers are appropriately identified with a prime notation. The position 10′ illustrates the closed position while the position 10 illustrates a pivoted position corresponding to an average speed at partial load (part throttle). In the partial load position the leading portion 16 has been displaced from the suction tube wall 18 which it nearly engages during its idling and low speed positions. As a result, a part of the air flowing through the suction tube 12 can also flow along the rear surface 20 of the air flow measuring valve 10. A restoring force for the air measuring valve 10 is produced by a spring (not shown) which acts directly on the air measuring valve 10. A hydraulic or alternative force can also be used for the restoring force.

With the air measuring valve 10 closed and with reduced air flows, the air measuring valve is displaced according to the impedance principle. With increased air flows, displacement is effected according to the airfoil principle. According to the impedance principle the valve is displaced by the pressure prevailing in front of and behind the air measuring valve, and according to the airfoil principle displacement of the air measuring valve depends on the lift forces of the air acting on the valve. With a constant lift, when the valve is opened, the predominant adjusting force gradually changes from an impedance force to a lift force, since the impedance force decreases as the valve is opened but the lift increases. Linearity of operation can be achieved if the ratio between the pivot angle or angle of rotation of the air measuring valve 10 and the cross-section which is left free by the same is constant, i.e., if a constant air velocity prevails in the cross-section.

The fuel is supplied via the pin 14 and is injected by means of one or more fuel injection nozzles 22. The fuel delivery system will be discussed in more detail below.

The air measuring valve 10 includes an auxiliary valve 24 which is attached to the main valve 26 by a bracket 28. As the opening cross-section increases, the force produced by the impedance decreases, and the auxiliary valve 24 becomes effective. At this point, the auxiliary valve 24 and the main valve 26 have air flowing on both sides according to the airfoil principle. When the air measuring valve 10 is closed (10′), as represented by the dashed lines, the auxiliary valve 24 is vertically disposed with respect to the air flow so that no lifting action can be effective relative to the pivot axis of the pin 14. Only when the air measuring valve 10 has opened to some extent, do the lift forces begin to be effective until, when the cross-section is fully open, they produce the predominant torque on the air measuring valve 10 about the pivot axis of the pin 14. The nozzle 22 injects the fuel, depending on the position of the air measuring valve and nozzle, into the chamber disposed in front of or below the air measuring valve. Thus the fuel is always injected into the region where the velocity of the air is greatest, thus ensuring that the fuel-air mixture is well prepared, as, at the edge 30 of the air measuring valve. This edge is located at the region with the highest air velocity at which tearing eddies or vortices are produced which make for excellent mixing of the fuel and air. At high speeds and full load, and thus with a high air flow, the air measuring valve 10 which, under these conditions, is maintained in its displaced position by the lift forces associated with the main valve and auxiliary valve, osculates on the wall 18 of the suction tube 12 and thus offers a minimum of resistance. In this position the fuel is injected into the suction tube virtually in an axial direction such that with the now large quantities of fuel the least possible amount of fuel reaches the wall of the suction tube. With this configuration of the invention, the lift forces begin to be effective very early on, namely at approximately the time that the air flows about the air measuring valve 10. As the air measuring valve 10 causes a change in the flow direction, the lift forces acting on the main valve 26 and auxiliary valve 24 not only act as right angles to the axis of the suction tube but, in accordance with their nature, at right angles to the axis of the suction tube but, in accordance with their nature, at right angles to the enforced flow direction and thus initially largely in the axial direction of the suction tube 12.

Figure 2:
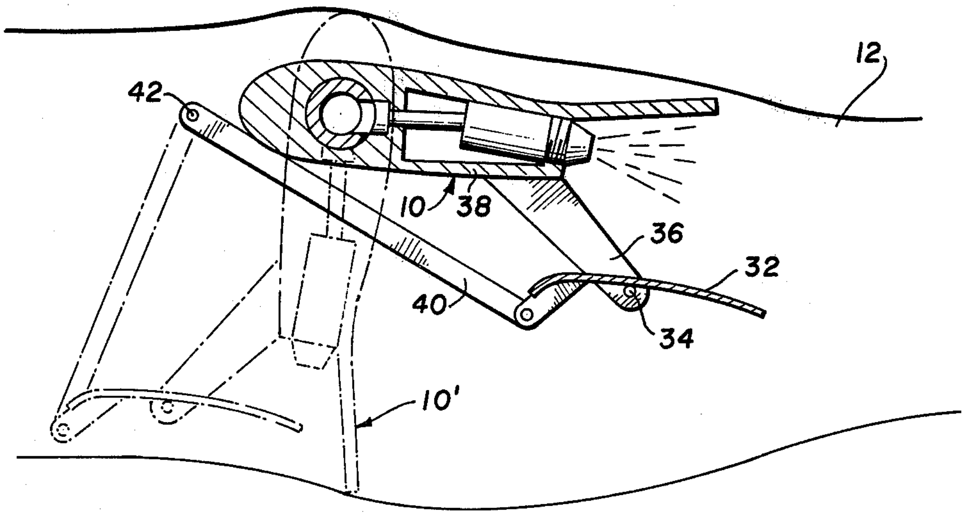
FIG. 2 illustrates a second embodiment of the invention with a differently shaped main valve and auxiliary valve.
Figure 5:
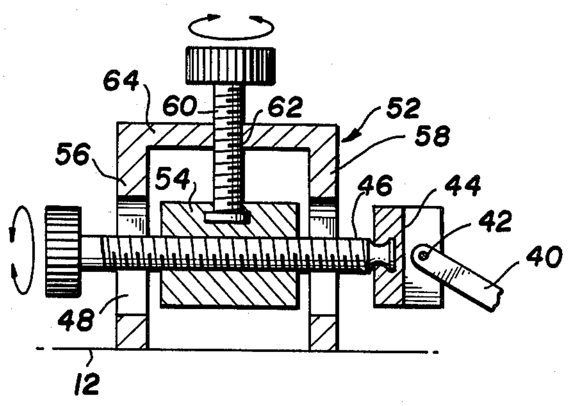
FIG. 5 illustrates the structure for controlling the displacement of the mounting pin and rod of the embodiment of FIG. 2.

The system illustrated in FIG. 2 corresponds to the principle of the embodiment illustrated in FIG. 1. In this case, the auxiliary valve 32 is not rigid but is rotatably mounted by a pin 34 to the web 36 of the main valve 38. The auxiliary valve 32 is controlled via a rod 40 such that it adopts essentially the same position with respect to the suction tube axis over the entire rotation range of the air measuring valve 10. The moment factor of the air measuring valve 10 can be changed by altering the position of the auxiliary valve 32. To this extent, the quantity of air to fuel can be varied by changing the position of the auxiliary valve 32 over the angle of rotation of the main valve 38. An alternation or adjustment of this nature can be made by changing the point of suspension or the location of the mounting pin 42 of the rod 40. This can be done by conventional structure, for example, by the structure shown in FIG. 5. It is shown in FIG. 5 how the mounting pin 42 can be adjusted both horizontally and vertically. The pin 42 is connected by a part 44 with a threaded rod 46. This rod passes through slots 48 and 50 of an adapter 52 fixed on the suction tube 12. A nut 54 is located between the two vertical pins 56 and 58. By turning the rod 46, the pin 42 can be adjusted horizontally. A second threaded rod 60 is connected with the nut 54 by a thread 62 in the upper horizontal part 64 of the adapter 52. By turning rod 60 the nut 54 and the pin 42 can be moved vertically. As a further example, not illustrated, such an alteration or adjustment can be made as a function of an element measuring the toxic constituents in the exhaust gas in order to change the fuel-air ratio so as to obtain a more advantageous exhaust gas composition; or such an alteration or adjustment can be made by means of bellows to obtain an error correction when as a result of air pressure variations, for example considerable variations, the original adjustment which is sought and which was engaged initially, is no longer correct.

Figure 3:
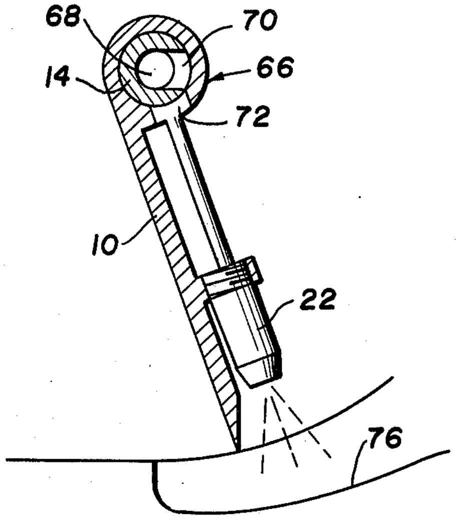
FIGS. 3 and 4 illustrate details of the fuel metering system used with the embodiments of FIGS. 1 and 2.
Figure 4:
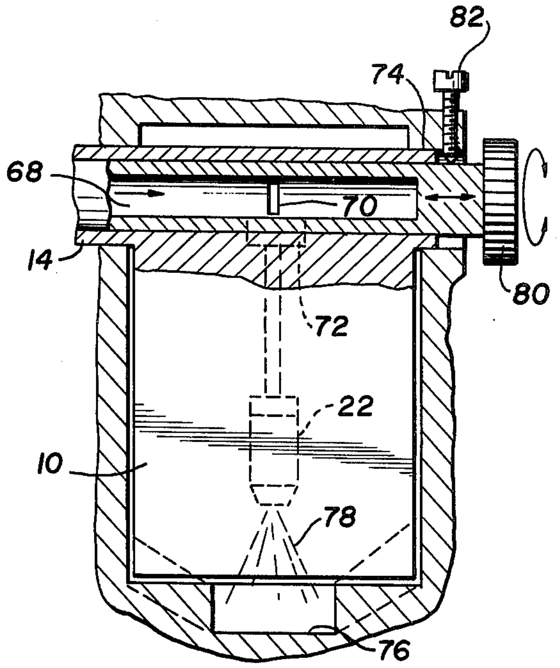

FIGS. 3 and 4 illustrate how the fuel is supplied through the pin 14 and is metered at the point 66 prior to being injected via the nozzle 22. The fuel flows in the direction of the arrow through the longitudinal bore 68 of pin 14. A slot 70 is disposed at right angles to the longitudinal axis and cooperates with the channel 72 of the air measuring valve 10. As is shown in FIG. 4, which shows a sectional view of the pin 14 and a bushing 74 passing straight through the slot 70, during rotation the channel 72 is increasingly opened, such that after a rotation of approximately 90°, the channel 72 or the entire slot 70 is opened. Thus, when the fuel is supplied to the metering point 72, 70 (fuel valve) under a constant pressure difference, the quantity of fuel which is metered corresponds to the particular angular position of the air measuring valve 10. The metering operation can also be effected in the most varied alternative ways, for example, in place of a slot 70, a bore which cooperates with the bore 72 can be provided, or in place of a slot an opening having a conical or alternative form can be provided.

The fuel is advantageously injected into a chamber 76. The width of this chamber increases in the flow direction and corresponds to the diameter of the injection cone 78 in the region of the chamber. The air is supplied via the valve in the lower speed range into the chamber 76 to obtain good fuel preparation. As shown, the pin 14 can be displaced axially and rotatably against bushing 74 by means of a knob 80. In order to lock the adjusted portion, a screw 82 is provided. These provisions allow fuel-flow corrections and in turn accurate adjustment of the fuel-air ratio.

Figure 6:
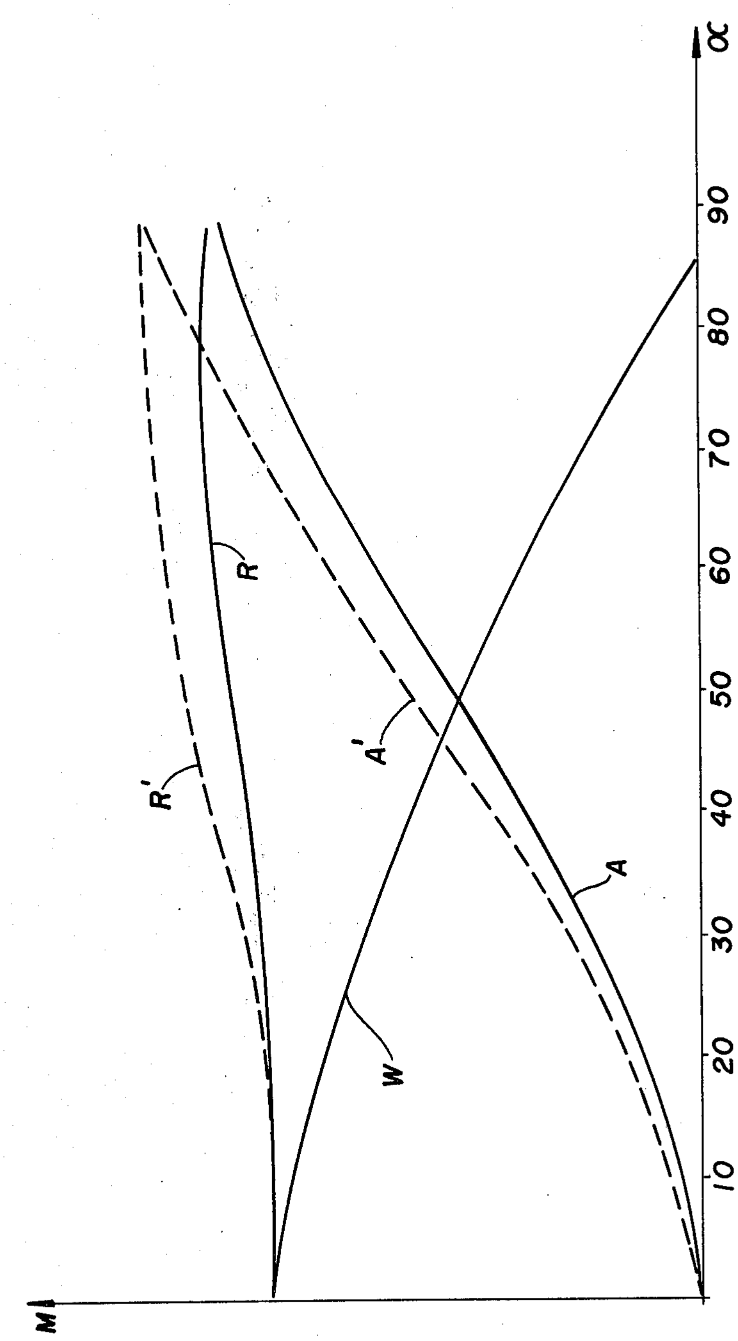
FIG. 6 is a diagram illustrating the variation of the moment acting on the air metering valve.

The operation of the air measuring valve will be described in further detail with reference to the diagram illustrated in FIG. 6. The moment M acting on the air measuring valve is represented by the ordinate and the angle of rotation of the air measuring valve by the abscissa. The curve W represents the variation of the moment over the angle of rotation which is caused to act on the air measuring valve by the flow impedance (pressure difference) and the curve A represents the variation of the moment produced by the lift force acting on the air measuring valve. The moment is formed in each case by the force of the air and the lever arm which is formed between the resultant center of pressure on the air measuring valve and the axis of rotation of the valve. When there is a flow impedance, the moment decreases as the opening angle increases because the impedance factor decreases and thus the pressure difference between the air pressure in front of and behind the air measuring valve also decreases. In contrast therewith, the lift moment increases since the effective surface remains constant, that is, the entire leading wing surface, but the lever arm, namely, the distance projected at right angles to the axis between the axis and the point of application of the lift force, decreases as the valve opens. This opposition of the applied moments produces a resultant curve R, the variation of which can be influenced. Depending on the form of the main valve, the auxiliary valve, the bracket with its kinematics and the suction tube with respect to the open cross section, the variation of this resultant curve and thus, the fuel-air ratio of the mixture may be predetermined. The dashed lines show the variation of the resultant which may be produced, for example, when the kinematic pivot point of the auxiliary valve according to FIG. 2 is altered. By virtue of a change in the composition of the exhaust gas, the moment variation A, A′ can be altered by displacing the suspension point 42, as a result of which the resultant then changes to R′. In any event, the subject of the present invention ensures that at full load the charging deficiencies are kept to a minimum as, in this speed range, the air measuring valve is not adjusted according to the impedance principle but according to the airfoil principle which operates with substantially lower flow losses.

What is claimed is:

1. In combination, the assembly including: air measuring valve means; biasing means; and an air suction tube of an internal combustion engine, the suction tube defining an air flow cross section and the air measuring valve means providing a controlled flow of air through the flow cross section, the improvement wherein:

the air measuring valve means is mounted eccentrically within the air suction tube for pivotal displacement by the air flow drawn into the suction tube by the engine against the force exerted on the air measuring valve means by the biasing means, said air measuring valve means including a main valve and an auxiliary valve with the outer surface of both valves being shaped to produce a lift force, said auxiliary valve being disposed adjacent to and preferably in the flow direction in front of the main valve; and the main valve and the suction tube have their cooperating surfaces relatively dimensioned so that the flow cross section in the region of the air measuring valve is closed by the main valve under the force of the biasing means during periods when the air flow ceases, is gradually opened at one end of the main valve by an impedance induced force as a function of the pressure difference prevailing on both sides of the air measuring valve, and is further opened at the other end of the main valve as the air flow increases through the opening at said one end, and an air flow is established around the auxiliary valve.

2. The combination as defined in claim 1, wherein the main valve has a short portion and a long portion due to its eccentric mounting, wherein the long portion extends toward the opening at said one end and is pivoted in the direction of air flow, and the short portion extends toward the opening at said other end and is pivoted against the direction of air flow.

3. The combination as defined in claim 1, wherein the auxiliary valve is rigidly coupled to the main valve.

4. The combination as defined in claim 1, with the assembly further including: bracket means; and rod means, wherein the auxiliary valve is mounted on said bracket means to be rotatable relative to the main valve wherein said rod means is mounted to the suction tube and connected to said bracket means, and wherein the auxiliary valve is kinematically displaceable with respect to the main valve thus developing a lifting force to assist in causing displacement of the main valve.

5. The combination as claimed in claim 4, wherein the mounting point of the rod means to the suction tube may be varied in order to change the air force moment or the fuel air mixture as a function of the air density or as a function of the engine characteristics such as the toxic content in the exhaust gas.

6. The combination as defined in claim 1, wherein the main valve is mounted at one side thereof directly to the suction tube.

7. The combination as defined in claim 1, further comprising a fuel injection nozzle, wherein the mounting means for pivotably mounting the air measuring valve includes a bushing with a bore in which a pin is disposed representing a fuel valve, said fuel valve including a further bore and at least one opening through which fuel is supplied to at least one channel, wherein said air measuring valve includes said at least one channel which communicates with said further bore through said opening, and wherein the nozzle is disposed at the end of the air measuring valve and communicates with the channel for discharging fuel into the suction tube.

8. The combination as defined in claim 7 wherein said at least one opening is a radial opening which cooperates with said channel for metering fuel through said channel in accordance with the angular position of the air measuring valve.

9. The fuel injection system as defined in claim 7 wherein the pin is rotatably displaceable for accurate adjustment of the fuel-air ratio.

10. The fuel injection system as defined in claim 7 wherein the pin is axially displaceable for accurate adjustment of the fuel-air ratio.

11. The fuel injection system as defined in claim 7 wherein the pin is rotatably and axially displaceable for accurate adjustment of the fuel-air ratio.

12. The fuel injection system as defined in claim 7 wherein the suction tube includes a fuel injection chamber defined by a wall portion thereof, wherein fuel is injected into said chamber by the injection nozzle, wherein air is guided into said chamber by the air measuring valve in particular when there are small opening cross-sections in the suction tube, and wherein the width of said chamber corresponds approximately to the diameter of the cone formed by the injected fuel at the region of said chamber.

* * * * *